J. B. TERRY.
Gasoline Head Light.
No. 3,507. Reissued June 15, 1869.
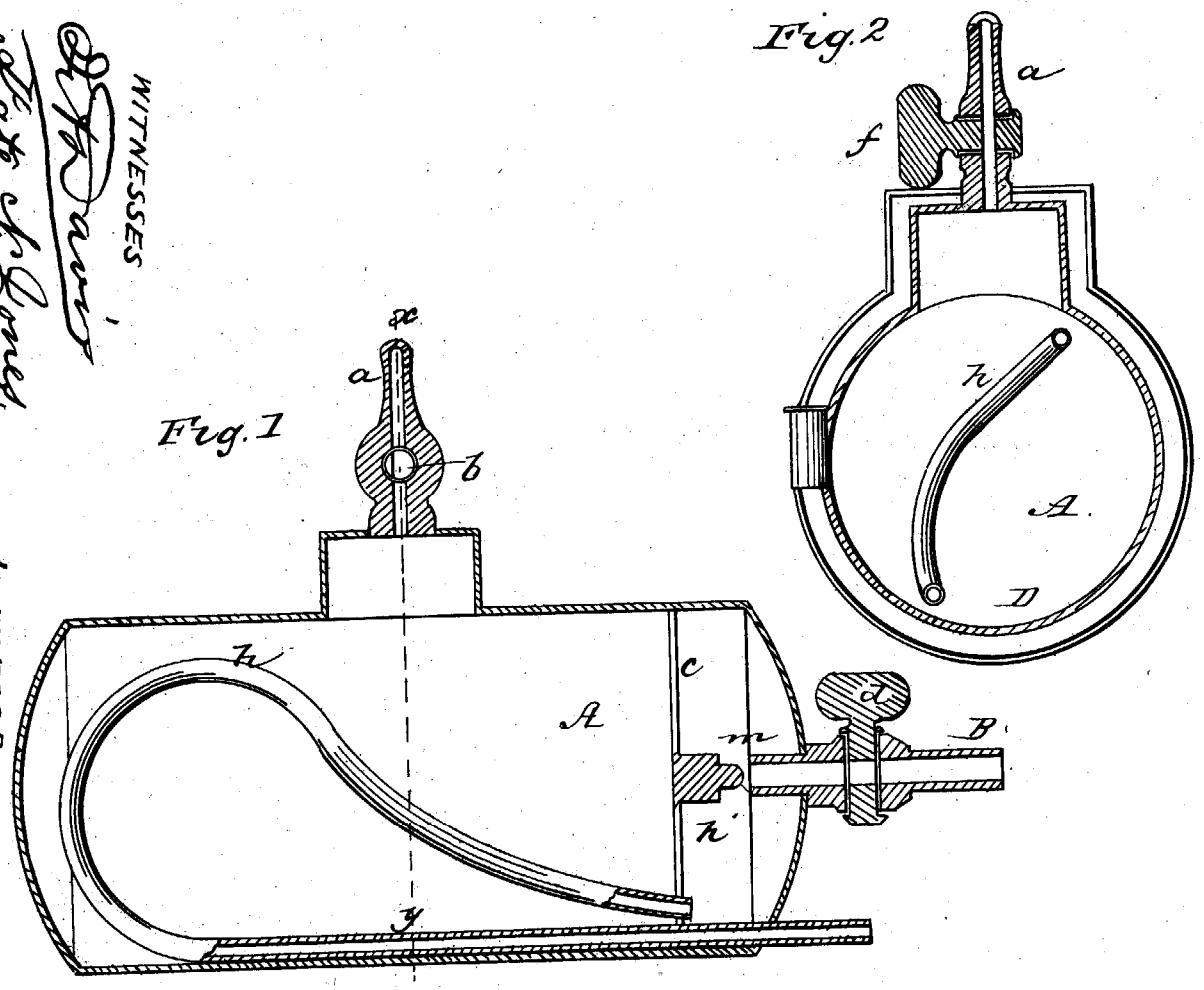
WITNESSES
D. H. Davis
Fate. N. Jones.
INVENTOR
Wm R. Griffith
by J. Fraser & Co attys
N. PETERS. Photo-Lithographer, Washington, D. C.

UNITED STATES PATENT OFFICE.

THE AMERICAN RAILWAY GAS LIGHT COMPANY, OF NEW YORK, N. Y., ASSIGNEES, BY MESNE ASSIGNMENTS, OF JOHN B. TERRY.

IMPROVED GASOLINE HEAD-LIGHT.

Specification forming part of Letters Patent No. 72,697, dated December 24, 1867; Reissue No. 3,507, dated June 15, 1869.

*To all whom it may concern:*

Be it known that JOHN B. TERRY, of Hartford, in the county of Hartford and State of Connecticut, invented certain new and useful Improvements in Locomotive Head-Lights, and whereas the sole and exclusive right thereof is vested in THE AMERICAN RAILWAY GAS-LIGHT COMPANY, of New York city; now, therefore, I, WILLIAM R. GRIFFITH, president of said company, do hereby declare the following to be a full, clear, and exact description of the same, reference being had to the accompanying drawings.

Said invention consists of an improved apparatus for the head light or lantern for railway-locomotives, composed essentially of a receptacle for gasoline or other hydrocarbon liquid, so connected with the boiler of a locomotive that steam therefrom may be employed to vaporize said liquid either by internal or external application, and, in combination therewith, of a suitable burner for the combustion of the vapor or gas so produced and employed in the reflector-box of the locomotive.

It also consists in an improved device for controlling and regulating the supply of the heating agent and in the holding of the hydrocarbon liquid, in combination with a porous or capillary material, whereby it is converted into vapor in a more equable and uniform manner, and undue agitation and swashing in the containing-vessel are prevented.

Figure 1 is a longitudinal vertical section of an apparatus constructed in acordance with my invention; and Fig. 2 is a transverse vertical section of the same on line *x y*, with the steam-jacket applied thereto, shown in red line.

The vessel A, which contains the gasoline or other light hydrocarbon fluid, is of cylindrical or other suitable form. It is provided with a burner, *a*, opened and closed by means of cock *b*, and with a supply-pipe, through which the liquid is introduced. It is divided by a flexible or elastic diaphragm of metal or other suitable material into two chambers of unequal dimensions, the larger of which contains the hydrocarbon liquid, and the smaller is connected with the locomotive-boiler by a steam-pipe, B, which is provided with the stop-cock *d*, by means of which steam can be admitted or excluded from the interior of said smaller chamber.

The steam may be applied to elevate the temperature of the hydrocarbon liquid to the vaporizing-point in either one of two methods—first, internally by means of a coil of pipe, *h*, opening into and receiving steam from the smaller chamber at *h'*, or externally by means of jacket surrounding the larger chamber, and communicating with the smaller chamber, as shown in red lines at D, Fig. 2.

To prevent the vapor or gas from being generated faster than it is consumed by the burner, this apparatus is so constructed as to be self-regulating in the following manner:

Attached to the flexible diaphragm *c* is a plug or conical valve-piece, *m*, placed in juxtaposition with and adapted to fit the mouth of the induction steam-pipe B. Its situation is such that in the normal condition of the diaphragm it does not close the mouth of the pipe B; but if the gas is generated more rapidly than required for the burner the pressure caused by its expansion in the larger chamber being in excess of the steam-pressure in the smaller chamber forces the flexible diaphragm *c* outward, and the valve *m* enters the pipe B, diminishing the space through which the steam enters, or shutting it off entirely, according to the amount of pressure exerted by the gas. By this arrangement the elevation of the temperature of the liquid and consequent generation of vapor is automatically regulated, so that uniformity is insured in the intensity of the light.

So far as the volatilization of the hydrocarbon liquid is concerned it is immaterial whether the steam be applied internally or externally under ordinary circumstances; but in situations where the locomotive must be driven through snows of great depth and in intense cold it is preferable that the heat be applied externally by the surrounding jacket, as thereby the liquid is better protected against such exposure as would condense the vapor and deprive the burner of its supply.

It is well known that volatile liquids vaporize with greater uniformity and freedom when held by the pores of an absorbent or capillary substance than when in a liquid body. Great difficulty has also been experienced in carrying a reservoir of liquid for illumination upon a locomotive, in consequence of the jar and vibration to which it is subjected from the motion of the engine. These difficulties are obviated in this invention by charging or loosely filling the larger chamber of the receptacle A with any fibrous, porous, or granulated material, by which the liquid is absorbed, and yields its vapor more freely and uniformly to the burner, while the swashing or agitation (which produces flickering and unsteadiness of the flame in burning) is entirely prevented. For this purpose the fine wood-shavings known in the trade as "excelsior" possess the proper degree of porosity and serve an excellent purpose.

The unusual and trying conditions under which the light of a locomotive has to be maintained has proved a serious obstacle to the successful operation of the various forms of lamps which have been used, owing to the difficulty of maintaining a uniform capillary supply when liquids are burned direct, and of gaseous products when volatile products are used in a plate of vapor; but by the within-described method the application of steam from the boiler, which is always in readiness when a light is required, enables the volatilization to be maintained and controlled in an effectual manner, producing a reliable light of high illuminating power and applicable to any known kind of vapor-burner, and at a moderate cost.

The application of heat of steam or other calorific agent for generating vapor from hydrocarbon liquids for lamp-burners is not claimed broadly, as I am aware that the same is not new; but

What is claimed as the invention of the said JNO. B. TERRY is—

1. A head light or lamp for locomotive-engines, produced by the vapor of a volatile hydrocarbon liquid generated by the heat of steam applied from the boiler of the locomotive, substantially as set forth.

2. The combination, with a hydrocarbon-liquid-holding vessel provided with a burner or burners, of an internal coil for admitting steam from the locomotive boiler to vaporize such liquid for the production of an illuminating-gas, substantially as set forth.

3. The combination, with a hydrocarbon-liquid vessel provided with a burner or burners, of a surrounding jacket for admitting steam from the locomotive-boiler for vaporizing such liquid for the purpose of generating an illuminating-gas, substantially as set forth.

4. The combination of a burner or lamp having its flame supplied by the vapor of a hydrocarbon liquid generated by the application of steam from the locomotive-boiler with the reflecting-box known as a "locomotive head-light," as set forth.

5. The combination, with the hydrocarbon-vessel, of an elastic diaphragm and valve or stopper, operating in connection with the steam-induction pipe for the automatic regulation of the vapor generated, substantially as set forth.

6. The employment, for locomotive head-lights, of porous, fibrous, or other capillary material for holding the hydrocarbon liquid in the vaporizing-vessel for the better volatilization by heat, substantially as set forth.

7. The use, in the liquid-holding vessel of locomotive lamps or head-lights, of porous, fibrous, or capillary material to prevent the swashing or agitation of the liquid under the motion of the locomotive, substantially as set forth.

WM. R. GRIFFITH.

Witnesses:
I. A. DAVIS,
K. N. JONES.